L. P. HARRIS.
Apparatus for Evaporating Saccharine Juices.
No. 1,465. Reissued April 28, 1863.
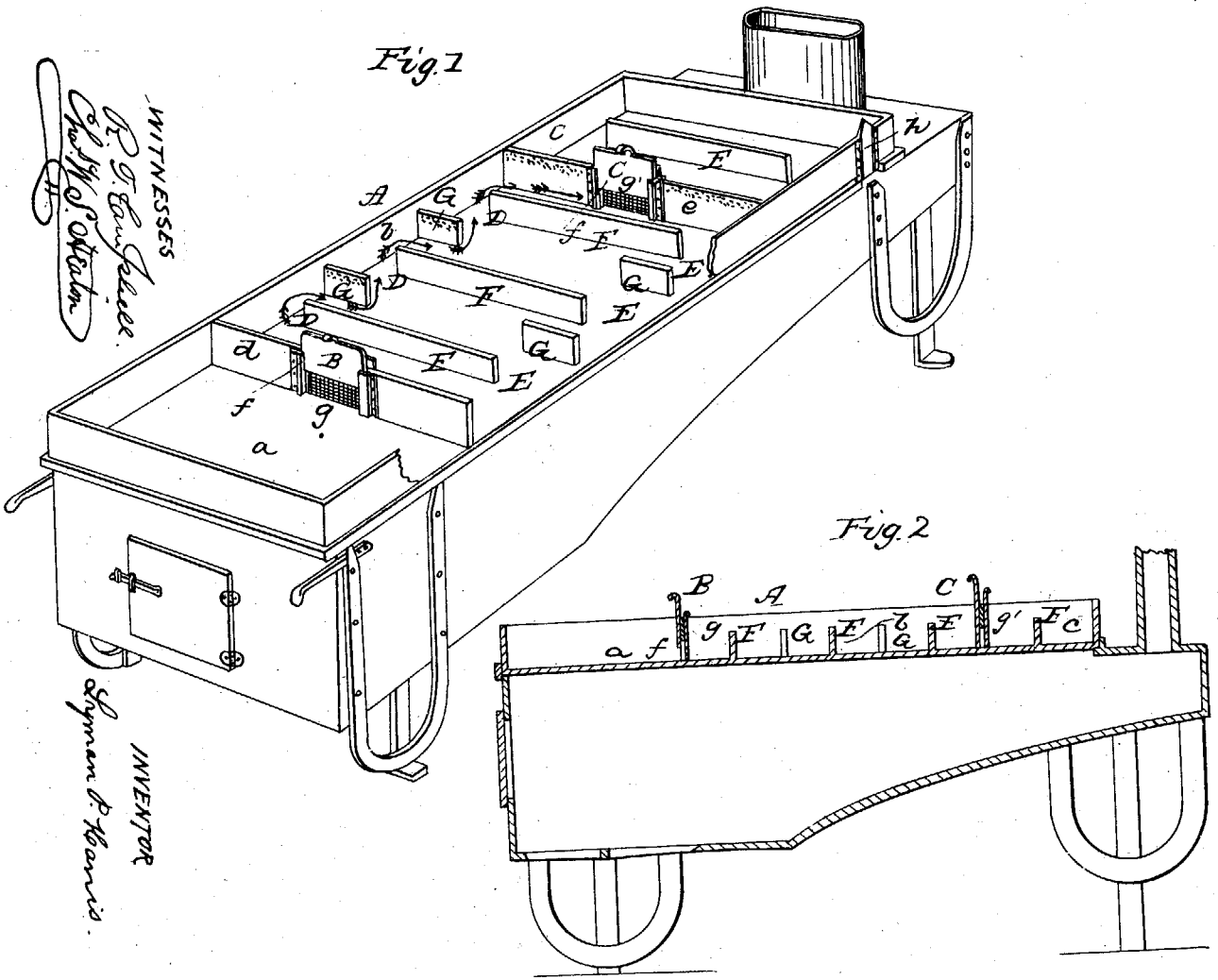
N. PETERS, Photo-Lithographer, Washington, D. C.

UNITED STATES PATENT OFFICE.

LYMAN P. HARRIS, OF MANSFIELD, OHIO.

IMPROVEMENT IN APPARATUS FOR EVAPORATING SACCHARINE JUICES.

Specification forming part of Letters Patent No. 22,648, dated January 18, 1859; Reissue No. 1,465, dated April 28, 1863.

*To all whom it may concern:*

Be it known that I, LYMAN P. HARRIS, of Mansfield, in the county of Richland and State of Ohio, have invented certain new and useful Improvements in Sugar and Sirup Juice Evaporators; and I do hereby declare that the following is a full, clear, and exact description of the same, reference being had to the accompanying drawings, forming part of this specification, in which—

Figure 1 is a perspective view of my improved evaporating-pan arranged on a portable fire-furnace. Fig. 2 is a vertical longitudinal section of the same.

The same letters of reference in the two figures indicate corresponding parts.

The nature of my invention consists in obtaining longitudinal channels for the circulation of the juice, and at the same time effect the arrest of the scum and feculencies, the theory of my plan being this, that an under-circulating stream of clear juice, and an upper retarded and retained strata of impure juice or scum exist at all times in the pan during the evaporating process, the clear juice running to the end of the pan under the accumulated scum in the several divisions, while the scum requires periodically to be removed with the skimmer.

My invention consists, further, in the combination of one or more high ledges with an underflow-passage and one or more centrally-located adjustable gates with a system of short and long ledges for the purpose of dividing the pan into evaporating, defecating, and finishing apartments, while the pan operates as above stated.

My invention consists, further, in the combination of a strainer or strainers with an evaporating-pan operating as herein described.

To enable others skilled in the art to make and use my invention, I will proceed to describe its construction and operation.

A represents an ordinary rectangular evaporating-pan adapted to be placed on any known style of fire-furnace, either stationary or portable. This pan I divide into the defecating, evaporating, and finishing compartments *a b c* by means of two high ledges, *d e*. The three compartments are allowed to communicate with one another by means of passages cut in the under edges of the high ledges, as indicated at *f f*. These passages are regulated by means of vertical slide-gates B C. There are also strainers *g g′* placed opposite the passages. The gates or the strainers may be used separately or together, accordingly as circumstances may require. So far as these gates, high ledges, and strainers are concerned, independent of their connection with the improvement developed in this patent, they operate the same as in the pan patented by me under Division No. 1, of a date even with this Division No. 2—that is, the under current of clear juice and the arrested top surface or scum current are controlled in the same manner. The plan of defecating, evaporating, and finishing apartments is also the same as plan shown in said Division No. 1, and therefore I here refer to that patent for a more full and complete statement of the principle of operation thereof.

The invention which I patent here is the formation of the channels D E in all descriptions of evaporating-pans. These channels may be on both sides of the hottest or "boiling" portion of the pan, and should be isolated to a considerable degree from the intense heat of the furnace, in order that the scum will flow toward them when ebullition of the juice is produced. To form these channels or longitudinal circulation-passages, I arrange long and short ledges F G G on the bottom of the pan, substantially as represented, the long ledges having a space between each of their ends and the sides of the pans, while the short ledges have no space between their ends and the sides of the pan. The arrows will illustrate fully the course of the clear juice, and the red dots the arrested strata of scum or impure juice. The scum by being arrested forms an incrusted cover, under which the juice as fast as purified or evaporated flows to the end of the pan and discharges through the outlet or gate into the finishing-chamber, and from there it is discharged through the valve *h*.

The ledges may be set straight or more or less oblique with respect to the ends of the pan.

The leading object of high ledges in a pan is to prevent an overflow from one channel or apartment to another.

What I claim as my invention, and desire to secure by Letters Patent, is—

1. An evaporating-pan which is constructed with one or more longitudinal channels, so as to allow the juice to circulate, and in its circulation to be deprived of its feculencies or scum, substantially as set forth.

2. Short ledges extending out from one or both sides of the pan, in combination with long ledges, substantially as and for the purpose set forth.

3. The combination of one or more high ledges, each having an underflow-passage, one or more adjustable gates, and a system of long and short ledges, substantially as and for the purpose set forth.

4. The combination of one or more strainers, one or more high ledges, and a system of long and short ledges, substantially as and for the purpose set forth.

LYMAN P. HARRIS.

Witnesses:

ROBT. W. FENWICK,

CHAS. MAN.